United States Patent
Apsey et al.

(10) Patent No.: US 10,961,153 B2
(45) Date of Patent: Mar. 30, 2021

(54) COMPOSITION FOR SYNTHETIC STONE

(71) Applicant: LUCITE INTERNATIONAL UK LIMITED, Billingham (GB)

(72) Inventors: Glenn Christopher Apsey, Preston Lancashire (GB); Alan William Andrews, Warrington Cheshire (GB)

(73) Assignee: MITSUBISHI CHEMICAL UK LIMITED, Billingham (GB)

( * ) Notice: Subject to any disclaimer, the term of this patent is extended or adjusted under 35 U.S.C. 154(b) by 156 days.

(21) Appl. No.: 16/082,960

(22) PCT Filed: Mar. 9, 2017

(86) PCT No.: PCT/GB2017/050638
§ 371 (c)(1),
(2) Date: Sep. 7, 2018

(87) PCT Pub. No.: WO2017/153764
PCT Pub. Date: Sep. 14, 2017

(65) Prior Publication Data
US 2019/0100461 A1    Apr. 4, 2019

(30) Foreign Application Priority Data
Mar. 9, 2016 (GB) ..................... 1604077

(51) Int. Cl.
| | | |
|---|---|---|
| C04B 26/06 | (2006.01) | |
| C04B 111/34 | (2006.01) | |
| C04B 111/54 | (2006.01) | |
| C04B 14/06 | (2006.01) | |
| C04B 40/06 | (2006.01) | |
| C04B 103/00 | (2006.01) | |

(52) U.S. Cl.
CPC .............. *C04B 26/06* (2013.01); *C04B 14/06* (2013.01); *C04B 40/065* (2013.01); *C04B 2103/0047* (2013.01); *C04B 2111/343* (2013.01); *C04B 2111/542* (2013.01)

(58) Field of Classification Search
CPC ....... C04B 14/06; C04B 26/06; C04B 40/065; C04B 2103/0047; C04B 2111/343; C04B 2111/542; C08K 2003/2227
See application file for complete search history.

(56) References Cited

U.S. PATENT DOCUMENTS

| | | | |
|---|---|---|---|
| 4,085,246 A | 4/1978 | Buser et al. | |
| 6,387,985 B1 | 5/2002 | Wilkinson et al. | |

FOREIGN PATENT DOCUMENTS

| | | |
|---|---|---|
| EP | 0639539 A1 | 2/1995 |
| EP | 0976786 A1 | 2/2000 |
| EP | 1878712 A1 | 1/2008 |
| JP | 2013-006923 A | 1/2013 |
| KR | 20040058769 A | 7/2004 |
| WO | 98/46679 A1 | 10/1998 |
| WO | 2015091318 A1 | 6/2015 |

OTHER PUBLICATIONS

WO 2015-091318 machine translation. (Year: 2015).*
International Preliminary Report on Patentability of PCT International App. No. PCT/GB2017/050638 dated Sep. 11, 2018 (13 pages).
International Search Report of PCT International App. No. PCT/GB2017/050638 dated May 30, 2017 (5 pages).
Written Opinion of the International Searching Authority of PCT International App. No. PCT/GB2017/050638 dated May 30, 2017 (15 pages).
JP Office Action (JP OA) for 2018-547473 dated Nov. 4, 2020 (11 pages).

* cited by examiner

*Primary Examiner* — Edward J Cain
(74) *Attorney, Agent, or Firm* — Shumaker, Loop & Kendrick, LLP

(57) ABSTRACT

There is described a composition for synthetic stone. The composition having (a) 3 to 25 wt % acrylic resin, the acrylic resin having:—(i) >50 upto 95 wt % methyl methacrylate and methyl methacrylate monomer residues, (ii) 4 to 40 wt % higher boiling point mono(alk)acrylate monomer, (iii) optionally, 0 to 10 wt % other acrylate or vinyl comonomer residues, and (iv) a crosslinking agent. The MMA residues of component (a)(i) are present in the acrylic resin in the form of a MMA residue containing (co)polymer, comprising at least 80% residues of MMA by weight of the (co)polymer. The composition further having (b) 70 to 95 wt % filler; and (c) optionally, a coupling agent. The composition being especially useful for the manufacture of synthetic stone for use in outdoor applications.

32 Claims, No Drawings

COMPOSITION FOR SYNTHETIC STONE

FIELD

The present invention relates to compositions for synthetic stone, more specifically, the present invention relates to methyl methacrylate based compositions for synthetic stone useful for outdoor applications and indoor uses such as kitchen worktops for improved resistance to cracking.

BACKGROUND

Natural stones, such as marble or granite, are often used in outdoor decorative and functional applications. However, the use of natural stone is costly due to expensive processing and limited supply. Additionally, natural imperfections can lead to cracking and general brittleness.

In an attempt to address the problems associated with natural stones, various synthetic stones have been described. Synthetic stones are generally moulded products based on a polymeric resin and high levels of natural and/or artificial aggregate. Synthetic stone can overcome many of the problems found with natural stone as well as replicating the desirable appearance of natural stone, and, in particular, this can be achieved at a significantly lower cost than natural stone.

The resins of synthetic stone compositions have generally focused on polyester based resins. Polyester based resins are especially useful for decorative interior applications. However, polyester based resins have low UV resistance meaning that performance in outdoor applications can be poor. As such, it is desirable to use a resin able to provide better weathering properties for outdoor applications.

Acrylic based systems have been found to provide improved outdoor weathering compared to polyester based systems. Acrylics result in a synthetic stone that has a lower degradation over time outdoors and especially a much higher resistance to sunlight than synthetic stone containing a polyester resin.

EP1878712 describes a process for manufacturing artificial stone boards suitable for outdoor use comprising a polymerisable resin that is formed from liquid methacrylate resin. Unfortunately, the final product is found to have crumbling at the edges. In addition, the curing system uses accelerators to activate otherwise high temperature initiators: the accelerators reduce pot-life and lead to discolouration of the resin.

WO2015091318 replaces MMA with very high levels of cyclic ester monomer in order to address various alleged problems including odour and uneven distribution of the coarse fillers. The cyclic ester monomer is an ester of (meth)acrylic acid with an alcohol having a cyclic radical and at least two oxygen atoms. WO' 318 goes on to teach the possibility of dispensing with MMA entirely without impairing the remaining properties of the artificial stones. However, the proposed monomer is very expensive.

U.S. Pat. No. 6,387,985 describes an acrylic and quartz based composition for surfacing material that improves temperature and impact performance over polyester based compositions and uses a urethane acrylate and styrene as well as MMA. Such products still suffer from discolouration as a result of weathering and cloudiness issues as well as utilizing expensive components.

Therefore, there is still a requirement for a composition for synthetic stone that enables high levels of MMA without suffering from crumbling or requiring expensive components or process adaptations. It is therefore an object of aspects of the present invention to address one or more of these, or other, problems.

SUMMARY

According to a first aspect of the present invention there is provided a composition for synthetic stone comprising:
(a) 3 to 25 wt % acrylic resin, the acrylic resin comprising:
  i. >50 up to 95 wt % methyl methacrylate and methyl methacrylate monomer residues,
  ii. 4 to 40 wt % higher boiling point mono(alk)acrylate monomer,
  iii. optionally, 0 to 10 wt % other acrylate or vinyl comonomer residues and
  iv. a crosslinking agent;
(b) 70 to 95 wt % filler; and
(c) optionally, a coupling agent,
  wherein the MMA residues of component (a)(i) are present in the acrylic resin in the form of a MMA residue containing (co)polymer, comprising at least 80% residues of MMA by weight of the (co)polymer.

According to an alternative first aspect of the present invention there is provided a composition for synthetic stone comprising:—
(a) 3 to 25 wt % acrylic resin, the acrylic resin comprising:—
  i. >50 up to 95 wt % methyl methacrylate and methyl methacrylate monomer residues,
  ii. 4 to 40 wt % higher boiling point mono(alk)acrylate monomer,
  iii. optionally, 0 to 10 wt % other acrylate or vinyl comonomer residues and
  iv. a crosslinking agent;
(b) 70 to 95 wt % filler; and
(c) optionally, a coupling agent.

Acrylic resin (a) and filler (b) are generally kept separate until shortly before processing. As such, also provided as a further aspect of the present invention is a kit of parts for forming synthetic stone, the kit of parts comprising:
  an acrylic resin part comprising an acrylic resin according to acrylic resin (a) of the first or alternative first aspect of the present invention, optionally further comprising coupling agent (c) of the first aspect of the present invention; and
  a filler part comprising a filler according to filler (b) of the first aspect of the present invention.

Acrylic resin (a) is typically a liquid resin operable to bind the filler component in the synthetic stone upon polymerisation.

The liquid resin may have a viscosity of between 200 and 1100 centipoise at 21° C. and 60 rpm spindle 2 setting, such as between 300 and 1000 centipoise, or between 400 and 900 centipoise. Preferably, the liquid resin has a viscosity of between 300 and 1000 centipoise at 21° C. and 60 rpm spindle 2 setting, more preferably between 350 and 800 centipoise, most preferably between 400 and 700 centipoise.

The acrylic resin may be present in an amount of between 4 and 20% by weight of the composition, preferably between 4 and 18 wt %, more preferably between 5 and 15 wt %. Accordingly, filler may be present at between 75 and 95 wt %, preferably, between 80 and 95 wt %, more preferably, between 80 and 90 wt %. These ranges of filler and resin may be combined in any combination, for example to allow for coupling agent to be present.

The MMA and/or MMA residues of component (a)(i) may be present in the acrylic resin in an amount of between 55 and 95% by weight of the acrylic resin, such as between 60 and 95 wt %, or between 65 and 95 wt %. Preferably, the MMA and/or MMA residues of component (a)(i) are present in an amount of between 70 and 95 wt %, more preferably between 75 and 93 wt % or between 77 and 89 wt %.

The term "MMA residues" is a term well known to those skilled in the art and refers to a moiety in an oligomer or polymer that was formed from an MMA monomer.

The MMA residues of (a)(i) may be present in oligomers and/or polymers. Suitably, the MMA and/or MMA residues are in the form of a mixture of MMA monomers and MMA residues.

Suitably, the MMA monomer component of (a)(i) is present in an amount of between 20 and 75% by weight of the acrylic resin, such as between 25 and 70 wt %, 30 and 65 wt % or between 32 and 60 wt %. Preferably, the MMA monomer component of (a)(i) is present in an amount of between 34 and 50% of by weight of the acrylic resin, such as between 38 and 50 wt %, more preferably between 40 and 48 wt %, and most preferably between 42 and 46 wt %.

The MMA residue component of (a)(i) may be present in an amount of between 20 and 75% by weight of the acrylic resin, such as between 25 and 70 wt %, 30 and 65 wt %, or between 30 and 60 wt %. Preferably, the MMA residue component of (a)(i) is present in an amount of between 30 and 55% or 30 and 50% by weight of the acrylic resin, such as between 33 and 45 wt %, more preferably between 35 and 43 wt % and most preferably between 37 and 41 wt %.

The MMA residues of component (a)(i) may be present in the acrylic resin in the form of a MMA residue containing (co)polymer, suitably the MMA residue containing (co)polymer comprises at least 70% residues of MMA by weight of the (co)polymer, such as at least 80 wt %, or at least 85 wt %. Preferably, the (co)polymer comprises at least 90 wt %, such as at least 95 wt %, more preferably at least 97 wt % and most preferably at least 99 wt % residues of MMA.

In addition to the MMA residues, the MMA residue containing (co)polymer may contain one or more other acrylate or vinyl comonomer residues ((a)iii) suitably formed from the comonomers selected from the group consisting of methyl acrylate, ethyl (meth) acrylate, propyl (meth)acrylate, butyl (meth)acrylate, hexyl (meth)acrylate, ethylhexyl(meth)acrylate, lauryl (meth)actylate, vinyl toluene and styrene, including all skeletal isomeric forms such as n-, sec-, tert-, and/or iso-forms, more typically, ethyl acrylate, butyl acrylate or styrene.

Preferably, the MMA residue containing (co)polymer is PMMA homopolymer.

The higher boiling point mono(alk)acrylate monomer, component (a)(ii), may be present in an amount of between 5 and 40% by weight of the acrylic resin, such as between 5 and 35 wt %, 5 and 30 wt % or 5 and 25 wt %. Preferably, component (a)(ii) is present in an amount of between 6 and 20% by weight of the acrylic resin, more preferably between 7 and 18 wt % or 7 and 15 wt %, most preferably between 7 and 14 wt %.

By "higher boiling point mono(alk)acrylate monomer" is meant a monomer that has a single (alk)acrylate group capable of polymerisation and a higher boiling point than MMA at standard atmospheric pressure, i.e. 1 bar. Component (a)(ii) may be selected from monomers having a higher boiling point than 101° C., such as >102° C., >105° C., >110° C. or >130° C., preferably >150° C., at standard atmospheric conditions.

Suitably component (a)(ii) is selected from the monomer(s) $(C_3-C_{12})$alkyl acrylate and/or $(C_2-C_{12})$alkyl $(C_1-C_5$ alk) acrylate. Preferably, component (a)(ii) is selected from monomer(s) according $(C_3-C_{10})$alkyl $(C_0-C_6$ alk)acrylate, more preferably $(C_3-C_5)$alkyl $(C_0-C_4$ alk)acrylate, most preferably, $(C_3-C_6)$alkyl $(C_0-C_2$ alk)acrylate. By $(C_0$ alk) acrylate is meant an unsubstituted acrylate wherein there is no alkyl substituent on the alpha carbon and wherein $C_5$ alkyl or above includes cycloalkyl.

The monomer(s) of component (a)(ii) may be selected from one or more of the group consisting of ethyl methacrylate, propyl (meth)acrylate, butyl (meth)acrylate, hexyl (meth)acrylate, 2-ethylhexyl(meth)acrylate, cyclohexyl (meth)acrylate and isobornyl(meth)acrylate including all skeletal isomeric forms such as n-, sec-, tert-, and/or iso-forms. Preferably, the monomer(s) of component (a)(ii) is butyl (meth)acrylate, more preferably, butyl methacrylate such as i-butyl methacrylate or n-butyl methacrylate.

Component (a)(ii) may be formed of two or more higher boiling point mono(alk)acrylate monomers, such as i-butyl methacrylate and n-butyl methacrylate, Crosslinker, component (a)(iii), may be present in an amount of between 0.01 and 10% by weight of the acrylic resin, such as between 0.1 and 5 wt % or between 0.2 and 4 wt %. Preferably, the crosslinking agent is present in amount of between 0.3 and 3 wt %, more preferably between 0.4 and 2 wt %.

The crosslinker may be selected from one or more of any suitable crosslinking agent, such as a polyfunctional methacrylate. For example, the crosslinker may be a di or tri-(meth)acrylate, such as 1,4-butanediol di(meth)acrylate, trimethylolpropane tri(meth)acrylate, ethylene glycol di(meth)acrylate, triethyleneglycoldimethacrylate (TEGDMA), 1,6-hexanedioldimethacrylate (HDDMA), 1,3-butanedioldimethacrylate (1,3-BDDMA) and/or allyl methacrylate including oligomeric di(meth)acrylates such as urethane di(meth)acrylate (UDMA) and/or polyethyleneglycoldimethacrylate (PEGDMA).

Preferably, the composition, kit of parts and synthetic stone of the present invention do not comprise an ionic crosslinker. An ionic crosslinker is a crosslinker that crosslinks using ionic bonds as oppose to covalent bonds. Ionic crosslinkers that may be excluded from the present invention may be salts of a divalent or multivalent cation, such as a metal oxide or hydroxide, that is capable of dissociating in water to form a divalent or multivalent cation. Suitably, the divalent or multivalent cation is operable to react with the carboxylic acid groups of an acrylic resin. Addition of ionic cross-linkers that induce curing or significantly increase solidification of the composition at room temperature is to be avoided (the present invention allows a pot life of several hours to be attained at ambient temperatures up to 40° C.).

The type and level of fillers used will depend on the aesthetic and performance requirements in the final product. Any filler may be used as long as they are compatible with the acrylic resin. Suitably, the filler may be or may comprise natural aggregate. As used herein, the term "natural aggregate" primarily means crushed or milled natural stone and minerals. The natural aggregate may be selected from one or more of the group consisting of calcium carbonate, quartz, cristobalite, granite, feldspar, marble, quartzite, dolomite, basalt, and ferrosilicon. Marble, granite, and quartz are particularly preferred, more preferably quartz.

The term "filler" may also be understood to include or be completely made up of other materials, often added polymeric compositions. Such fillers may include one or more of silica (for example fumed or milled silica), clay, fly ash, cement, broken ceramics, mica, silicate flakes, broken glass, glass beads, glass spheres, mirror fragments, steel grit, aluminum grit, carbides, plastic beads, pelletized rubber, ground polymer composites, polymer flakes, graphite, fibers, wood chips, sawdust, paper laminates, barium sulfate, aluminum hydroxide, aluminum oxides, aluminum silicates, pigments, colorants, and mixtures thereof.

Preferably, filler (b) is selected from the group consisting of natural aggregate, such as quartz, fumed or milled silica and/or an inorganic pigment, such as $TiO_2$. Suitably filler (b) comprises between 0.01 and 5% of pigment by weight of the composition, such as between 0.05 and 3 wt %, or 0.1 and 2 wt %.

The size of the filler particles may vary depending upon the end use of the material. The size of the filler may depend on the aesthetic required. Plain colours will usually have smaller particles sizes whereas granites will contain a combination of different sizes depending on the effect required. Some stones may also contain large particle mirror glass. In most processes the average size d50 of the filler (b) particles is <50 mm, preferably <40 mm, more preferably <30 mm. Filler component (b) may comprise a filler fraction having an average particle size within the range 0.01 mm to 100 mm, such as between 0.01 and 5 mm, 0.03 and 4 mm, or between 0.03 and 3 mm. Suitably, these sizes are particularly applicable to the natural aggregate in the filler.

Filler component (b) may be formed of fractions having different average particles sizes. Filler (b) may comprise a fraction having an average particle size of between 0.01 and 0.3 mm, such as between 0.1 and 0.3 mm; a fraction having an average particle size of between 0.3 and 0.8 mm; and a fraction having an average particle size of between 0.8 and 5 mm, such as between 0.8 and 3 mm, or between 0.8 and 2 mm. Particle size may be determined using a laser process such as a Sedigraph III 5120 particle size analyser or by sieve sizes.

In addition to the filler fraction sizes above, which may be considered to be the coarse filler fractions, filler component (b) may comprise a fine filler fraction with an average particle size that is smaller than the average particle size of the coarse filler fraction(s). For example, the average particle size of the fine filler fraction may be <500 µm, such as <200 µm, or <100 µm or <50 µm. Suitably, the fine filler fraction comprises silica, such as milled or fumed silica.

The fine filler fraction may be present in filler (b) in an amount of between 0 and 40% by weight of the filler component, such as between 5 and 35 wt %, or 10 and 30 wt %, preferably, 15 and 25 wt %. The coarse filler fraction may be present in an amount of between 60 and 100% by weight of the filler component, such as 65 and 95 wt %, or 70 and 90 wt %, preferably 75 and 85 wt %.

The composition may further comprise a coupling agent, component (c), to promote adhesion between filler component (b) and resin component (a). Suitably, the composition comprises between 0.1 and 5% of a coupling agent by weight of the resin, such as between 0.5 and 3 wt % or between 0.7 and 2.5 wt %, preferably between 0.8 and 1.5 wt %.

The coupling agent may be a silane coupling agent, such as methacryloylpropyltrimethoxysilane, vinyl trimethoxysilane, vinyl triethoxysilane and 3-mercaptopropyltrimethoxysilane.

The composition may further comprise an initiator system, component (d). Preferably, the initiator system is operable to be thermally activated.

The initiator system may comprise at least a first initiator that has a half-life of up to one hour at below 85° C. or 80° C., such as below 75° C., 70° C. or below 65° C. Suitably, the first initiator has a half-life of one hour at below 85° C. or 80° C., such as below 75° C., 70° C. or below 65° C.

Preferably, the first initiator is storage stable at up to 20° C. such as for at least 3 months. Suitably, the first initiator is storage stable at up to 25° C., preferably up to 30° C., more preferably up to 35° C., suitably for at least 3 months. As such, preferably the initiator system allows for rapid onset of polymerisation at relatively low temperatures but above ambient temperature.

Suitably, the initiator system comprises a mixture of two or more initiators. The initiator system may comprise a second initiator that is operable to initiate polymerisation of the acrylic resin at higher temperatures than the first initiator. The second initiator may have a half-life of up to one hour at 95° C., such as 90° C. or 85° C. Suitably, the second initiator has a half-life of up to one hour at below 95° C., such as below 90° C. or below 85° C. Preferably, the second initiator has a half-life of one hour at below 95° C., such as below 90° C. or below 85° C. Preferably, the second initiator is storage stable at up to 25° C. More preferably, the second initiator is storage stable at up to 30° C., such as up to 35° C.

Suitably, by "storage stable" it is meant the initiator is stable and efficacy loss will be minimal. By "minimal" it is meant preferably less than 25%, such as 10%, such as less than 5% or less than 1% loss in effectiveness of the initiator in the polymerisation reaction as measured by unreacted monomer.

Suitably, initiator system (d) is formed of radical initiators. The radical initiators of system (d) may be one or more initiators selected from the group consisting of a peroxide and/or azo-type initiators, preferably at least one peroxide-type initiator, suitably as the first initiator type. Optionally, the second initiator type is an azo initiator.

Initiator system (d) may comprise one or more initiators selected from the group consisting of di-(t-butyl-cyclohexyl) peroxydicarbonate, azo-di-isobutyronitrile, dilauroyl peroxide, dibenzoyl peroxide, 2,2'-azodi(2-methylbutryonitrile) and/or dicetylperoxydicarbonate.

Preferably, initiator system (d) is formed of di-(t-butyl-cyclohexyl)peroxydicarbonate as the first initiator and azo-di-isobutyronitrile as the second initiator and optionally a third initiator. The third initiator may be tert-butyl peroxybenzoate.

Advantageously, the initiator system of the present invention delivers an extended pot life at ambient temperatures but rapidly cures the bulk of the slab before it reaches temperatures in the oven at which significant levels of MMA may be lost, such as 80° C. or above. As such, the initiator system of the present invention allows for preparation and handling of the activated resin and its mixing with the filler fractions without significant curing commencing. This is particularly advantageous for allowing transfer of the mix to the mould and filling of the mould when the process may be carried out in regions with high ambient temperatures.

Initiator system (d) may be pre-mixed with acrylic resin (a) and/or the filler (b). The initiator system (d) may also be brought together with acrylic resin (a) and filler (b) only shortly before processing.

Therefore, according to another aspect of the present invention there is provided a kit of parts for forming synthetic stone, the kit comprising:
  an acrylic resin part comprising an acrylic resin according to acrylic resin (a) of the first aspect or alternative first aspect of the present invention, optionally further comprising coupling agent (c) of the first aspect of the present invention;
  a filler part comprising a filler according to filler (b) of the first aspect of the present invention; and an initiator part comprising an initiator system according to initiator system (d) of the first aspect of the present invention.

Optionally, the acrylic resin part may be pre-mixed with the initiator part, preferably after a silane coupling agent. Typically, this liquid phase is then mixed into a premixed filler and pigment composition.

The composition according to any aspect of the present invention may further contain other additives such as UV stabilizers, inhibitors or regulators. Further, the composition may contain other adjuvants such as defoamers, rheology additives, levelling agents, wetting agents and/or dispersing agents.

Preferably, the composition comprises a UV stabiliser in an amount of between 0.1 and 5% by weight of the resin, such as between 0.5 and 4 wt % or between 1 and 3 wt %.

The composition according to the aspects of the present invention is especially suitable for manufacturing synthetic stone for use outdoors, such as for the production of tabletops, countertops, architectural facings, walkways, patio furniture, decorative stone, outdoor tile, flooring, mantles, wall facings, and imitation stone structures, among others.

Advantageously the high MMA content synthetic stone compositions of the present invention can be used for forming acrylic synthetic stone having reduced levels of crumbliness without requiring adaption of the normal processing methods. Furthermore, compared to low MMA content acrylic synthetic stone compositions, compositions of the present invention provide improved ease of compatibility control in combination with a lower cost. Still further the compositions of the present invention show thermal expansion and contraction resistance.

The synthetic stone of the present invention advantageously provides improved stain resistance and/or resistance to high temperature shocks, for example high temperature shocks caused by the placing of a hot object on the synthetic stone. Accordingly, the synthetic stone of the present invention may be used to provide superior properties for interior applications, such as for the manufacture of work tops and the like.

According to a further aspect of the present invention there is provided a method of manufacturing synthetic stone comprising the following steps:
 a. mixing an acrylic resin according to acrylic resin (a) of the first aspect or alternative first aspect of the present invention, a filler according to filler (b) of the first aspect of the present invention, and optionally a coupling agent (c) and optionally an initiator system (d), preferably mixing until the components have been homogenised with the resin;
 b. adding the mixture to a mould and substantially deaerating the mixture, preferably with the application of vacuum, compaction and/or vibration;
 c. curing the mixture by heating, preferably by heating to a temperature of between 75° C. and 130° C., such as between 85° C. and 125° C.; and
 d. optionally polishing the cured mixture.

Accordingly, synthetic stone may be produced from compositions according to the present invention by the normal method of vibro-compression under vacuum, commonly known as the Breton Process, followed by heating to harden the resin.

The vibrators used are those typically used in a Breton Process, known to those skilled in the art.

According to a further aspect of the present invention there is provided a method of manufacturing synthetic stone comprising the following steps:
 a. mixing an acrylic resin according to acrylic resin (a) of the first aspect or alternative first aspect of the present invention, a filler according to filler (b) of the first aspect of the present invention, and optionally a coupling agent (c) and optionally an initiator system (d), preferably mixing until the components have been homogenised with the resin;
 b. substantially deaerating the mixture,
 c. adding the mixture to a press, for example a double-belt;
 d. curing the mixture by heating, preferably by heating to a temperature of between 75° C. and 130° C., such as between 85° C. and 125° C.; and
 e. optionally polishing the cured mixture.

Suitably, an in-line mixer is used to deaerate the mixture.

In a method according to any aspect of the present invention the MMA residue component of (a)(i) may be present, when initially mixed with (b) in step a, in an amount of at least 20% by weight of the acrylic resin.

Preferably, the methods of the present invention do not comprise the use of an ionic crosslinker as herein defined.

According to a further aspect of the present invention, there is provided synthetic stone formed from a composition or kit according to any other aspect of the present invention.

According to a further aspect of the present invention, there is provided synthetic stone comprising:—
 (a) 3 to 25 wt % acrylic resin, the acrylic resin comprising:—
  i. >50 upto 95 wt % methyl methacrylate monomer residues,
  ii. 4 to 40 wt % higher boiling point mono(alk)acrylate monomer residues,
  iii. optionally, 0 to 10 wt % other acrylate or vinyl comonomer residues and
  iv. crosslinking agent residues;
 (b) 70 to 95 wt % filler; and
 (c) optionally, coupling agent residues.

The acrylic resin, component (a); methyl methacrylate monomer residues, component (a)(i); higher boiling point mono(alk)acrylate monomer residues, component (a)(ii); the other acrylate or vinyl comonomer residues, component (a)(iii); crosslinking agent residues, component (a)(iv); filler, component (c); and coupling agent residues, component (c) of the synthetic stone of the present invention are defined according to the respective components of the first, or any other, aspect of the present invention. Specifically, as defined for the acrylic resin, component (a); MMA and MMA residues, component (a)(i); higher boiling point mono (alk)acrylate monomer, component (a)(ii); the other acrylate or vinyl comonomer residues, component (a)(iii); crosslinking agent, component (a)(iv); filler, component (c); and coupling agent, component (c) of the first, or any other aspect, of the present invention, respectively. It will be apparent that the term "residues" refers to the presence of a moiety in the synthetic stone that was formed from the respective component as defined in the first or other aspect of the present invention after synthetic stone production. Reference to "first aspect" herein refers to either the first aspect or the alternative first aspect unless provided otherwise.

According to a further aspect of the present invention, there is provided synthetic stone produced by a method according to any aspect of the present invention.

According to a further aspect of the present invention, there is provided the use of a composition or kit according to any aspect of the present invention in the manufacture of synthetic stone.

The resins used in the present invention are acrylic resins. Without prejudice to the definitions herein the stone compositions of the present invention should generally be taken to be stone compositions having resin with greater than 50%, more specifically, greater than 54%, more preferably, greater than 60% or 70 wt % or 90 wt % acrylic residues in the resin component of final polymerised stone composition. As such, the present invention does not extend to polyester based resin stone compositions which may be taken to have greater than 50%, more preferably, greater than 60% or 70 wt % or 90 wt % polyester repeat units in the resin component of the final polymerised stone composition. Generally, therefore, the acrylic resin component of the present invention forms more than 95 wt % of total resin in the composition, more typically, more than 98 wt %, most typically, around 100 wt % of the total resin in the stone composition.

It will be appreciated that two or more of the optional features of any aspect of the invention may be combined or may be combined with any other aspect of the invention mutatis mutandis.

For a better understanding of the invention, and to show how embodiments of the same may be carried into effect, reference will now be made, by way of example, to the following experimental data.

EXAMPLES

Examples produced showing relative friability:—

Inventive Example 1: 44.2% methyl methacrylate (MMA). 5.4% i-butyl methacrylate, 8.8% n-butyl methacrylate, 0.6% ethylene glycol dimethacrylate, 38.8% polymethyl methacrylate (Elvacite 4071) (all w/w %) and 2.2 w/w % of a combination of UV stabilisers, dispersant and dispersant carrier (0.09 w/w % 2-(2H-benzotriazol-2-yl)-p-cresol (UV stabiliser), 0.04% Bis(2,2,6,6-tetramethyl-4-piperidyl) sebacate (hindered amine light stabiliser), 0.1 w/w % 2,6-di-tert-butyl-4-methylphenol (stabiliser) 1 w/w % glycerol triacetate and 1 w/w % sorbitan trioleate) were rolled overnight at room temperature to form a uniform mixture. The viscosity of the resin was measured at 654 centipoise at 21 C using a Brookfield Viscometer (60 rpm, spindle 2). To the resin 1 wt % 3-methacryloxy-n-propyltrimethoxysilane was added and fully mixed followed by 0.4 wt % di-(t-butyl-cyclohexyl)peroxydicarbonate and 0.5 wt % azo-di-isobutyronitrile.

A quartz filled mix was then prepared using 8.9 w/w % of the activated resin, together with 0.5 w/w % inorganic colouring pigment (e.g. DuPont TiPure R960), 21.6 w/w % milled silica (<45 micron), 21.4 w/w % quartz (0.1-0.3 mm), 23.8 w/w % quartz (0.3-0.8 mm) and 23.8 w/w % quartz (0.8-2 mm). The fully mixed composition had the appearance of wet sand.

The composition was transferred to a mould which consisted of upper and lower steel plates which had been treated with a mould release agent (Lucite MR12). The composition was spread on to the lower plate and the upper plate lowered on top. The composition was subjected to a combination of pressure (3 bar) from a hydraulic ram and vacuum (22 mmHg) to remove air.

The slab was placed in an oven set to 125° C. and left to cure for 35 minutes. Afterwards the slab was removed from the mould and inspected for surface quality and friable edges. The sample scored a relative 5 out of 5 based on having compact and non-friable edges, i.e. the edges being intact and attached to the bulk of the slab.

Comparative Example 1: Using the same process and parameters as given for Inventive Example 1, a comparative example containing an acrylic resin comprising 58.4% methyl methacrylate, 0.6% ethylene glycol dimethacrylate and 38.8% polymethyl methacrylate (Elvacite 4071) (all w/w %) and 2.2 w/w % of a combination of UV stabilisers, dispersant and dispersant carrier (0.09 w/w % 2-(2H-benzotriazol-2-yl)-p-cresol (UV stabiliser), 0.04% Bis(2,2,6,6-tetramethyl-4-piperidyl) sebacate (hindered amine light stabiliser), 0.1 w/w % 2,6-di-tert-butyl-4-methylphenol (stabiliser) 1 w/w % glycerol triacetate and 1 w/w % sorbitan trioleate) was prepared and then used to make a slab.

Once the slab was removed from the mould and inspected it scored a relative 1 out of 5 on edge friability, i.e. it had edges which were friable and easily removed from the bulk of the slab.

Compatibility

Inventive Example 2: The resin described in Inventive Example 1 was mixed thoroughly with 0.020% azo-di-isobutyronitrile and 0.025% 2,2'-azobis-(2,4-dimethylvaleronitrile) and poured into a 100 ml polypropylene beaker to a depth of 100 ml and the weight was recorded.

The sample was then cured in a water bath at 60° C. for 24 hours. To ensure complete curing of the monomers the sample was heated in an air oven at 80° C. for 2 hours followed by 105° C. for a further 2 hours. Afterwards the sample was removed from the beaker and inspected visually. Using a scale of 5 to 0 (5 being completely clear and colourless in appearance, 3 being acceptable and 0 being almost opaque) the sample has a clarity rating of 5.

Inventive Example 3: A resin comprising 40.9% methyl methacrylate. 17.5% n-butyl methacrylate, 0.6% ethylene glycol dimethacrylate and 38.8% polymethyl methacrylate (Elvacite 4071) (all w/w %) and 2.2 w/w % of a combination of UV stabilisers, dispersant and dispersant carrier (0.09 w/w % 2-(2H-benzotriazol-2-yl)-p-cresol (UV stabiliser), 0.04% Bis(2,2,6,6-tetramethyl-4-piperidyl) sebacate (hindered amine light stabiliser), 0.1 w/w % 2,6-di-tert-butyl-4-methylphenol (stabiliser) 1 w/w % glycerol triacetate and 1 w/w % sorbitan trioleate) was prepared according to the above method.

On removing the cured sample from the mould it had a clarity rating of 3.

Comparative example 2: A resin comprising 31.2% methyl methacrylate. 40% i-butyl methacrylate, 0.6% ethylene glycol dimethacrylate and 26% polymethyl methacrylate (Elvacite 4071) (all w/w %) and 2.2 w/w % of a combination of UV stabilisers, dispersant and dispersant carrier (0.09 w/w % 2-(2H-benzotriazol-2-yl)-p-cresol (UV stabiliser), 0.04% Bis(2,2,6,6-tetramethyl-4-piperidyl) sebacate (hindered amine light stabiliser), 0.1 w/w % 2,6-di-tert-butyl-4-methylphenol (stabiliser) 1 w/w % glycerol triacetate and 1 w/w % sorbitan trioleate) was prepared according to the above method.

On removing the cured sample from the mould it had a clarity rating of 1.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A composition for synthetic stone comprising:—
   a. 3 to 25 wt % acrylic resin, the acrylic resin comprising:—
      i. >50 up to 95 wt % methyl methacrylate (MMA) and methyl methacrylate (MMA) monomer residues,
      ii. 4 to 40 wt % higher boiling point mono(alk)acrylate monomer,
      iii. optionally, 0 to 10 wt % other acrylate or vinyl comonomer residues, and
      iv. a crosslinking agent;
   b. 70 to 95 wt % filler; and
   c. optionally, a coupling agent;
      wherein the MMA residues of component (axi) are present in the acrylic resin in the form of a MMA residue containing (co)polymer, comprising at least 80% residues of MMA by weight of the (co)polymer.

2. A kit of parts for forming synthetic stone, the kit of parts comprising:
   an acrylic resin part comprising an acrylic resin according to acrylic resin (a) as defined in claim 1, optionally further comprising coupling agent (c) as defined in claim 1; and
   a filler part comprising a filler according to filler (b) as defined in claim 1, wherein the MMA residues of component (a)(i) are present in the acrylic resin in the form of a MMA residue containing (co)polymer, comprising at least 80% residues of MMA by % weight of the (co)polymer.

3. The composition according to claim 1, wherein the acrylic resin is present in an amount of between 4 and 20% by weight of the composition.

4. The composition according to claim 1, wherein the filler is present at between 75 and 95 wt % by weight of the composition.

5. The composition according to claim 1, wherein the MMA and/or MMA residues of component (a)(i) is present in the acrylic resin in an amount of between 55 and 95% by weight of the acrylic resin.

6. The composition according to claim 1, wherein the MMA monomer component of (a)(i) is present in an amount of between 20 and 75% by weight of the acrylic resin.

7. The composition according to claim 1, wherein the MMA residue component of (a)(i) is present in an amount of between 20 and 75% by weight of the acrylic resin.

8. The composition according to claim 1, wherein the MMA residues of component (a)(i) are present in the acrylic resin in the form of a MMA residue containing (co)polymer, the MMA residue containing (co)polymer comprises at least 70% residues of MMA by weight of the (co)polymer.

9. The composition according to claim 8, wherein the MMA residue containing (co)polymer is PMMA homopolymer.

10. The composition according to claim 1, wherein a higher boiling point mono(alk)acrylate monomer, component (a)(ii), is present in an amount of between 5 and 40% by weight of the acrylic resin.

11. The composition according to claim 1, wherein component (a)(ii) is selected from monomers having a higher boiling point than 101° C. at standard atmospheric conditions.

12. The composition according to claim 1, wherein component (a)(ii) is selected from the monomer(s) ($C_3$-$C_{12}$)alkyl acrylate and/or ($C_2$-$C_{12}$)alkyl ($C_1$-$C_8$ alk)acrylate.

13. The composition according to claim 1, wherein the monomer(s) of component (a)(ii) are selected from one or more of the group consisting of ethyl methacrylate, propyl (meth)acrylate, butyl (meth)acrylate, hexyl (meth)acrylate, 2-ethylhexyl(meth)acrylate, cyclohexyl (meth)acrylate and isobornyl(meth)acrylate including all skeletal isomeric forms such as n-, sec-, tert-, and/or iso-forms.

14. The composition according to claim 1, wherein component (a)(ii) is formed of two or more higher boiling point mono(alk)acrylate monomers.

15. The composition according to claim 1, wherein the crosslinking agent (a)(iv) is present in an amount of between 0.01 and 10% by weight of the acrylic resin.

16. The composition according to claim 1, wherein the filler comprises a natural aggregate.

17. The composition according to claim 1, wherein filler (b) comprises between 0.01 and 5% of pigment by weight of the composition.

18. The composition according to claim 1, wherein the average size d50 of the filler (b) particles is <50 mm.

19. The composition according to claim 1, wherein filler component (b) comprises a coarse filler fraction having an average particle size within the range 0.01 mm to 100 mm.

20. The composition according to claim 19, wherein filler component (b) comprises a fine filler fraction with an average particle size that is smaller than the average particle size of the coarse filler fraction(s).

21. The composition according to claim 20, wherein the fine filler fraction is present in filler (b) in an amount of between 0 and 40% by weight of the filler component.

22. The composition according to claim 19, wherein the coarse filler fraction is present in an amount of between 60 and 100% by weight of the filler component.

23. The composition according to claim 1, further comprising coupling agent, component (c).

24. The composition according to claim 1, further comprising an initiator system, component (d).

25. The composition according to claim 24, wherein the initiator system comprises at least a first initiator that has a half-life of up to one hour at below 80° C.

26. The composition according to claim 25, wherein the initiator system comprises a mixture of two or more initiators.

27. The composition according to claim 24, wherein initiator system (d) comprises one or more initiators selected from the group consisting of di-(t-butyl-cyclohexyl)peroxydicarbonate, azo-di-isobutyronitrile, dilauroyl peroxide, dibenzoyl peroxide, 2,2'-azodi(2-methylbutryonitrile) and/or Dicetylperoxydicarbonate.

28. A kit of parts for forming synthetic stone, the kit comprising:
   an acrylic resin part comprising an acrylic resin according to acrylic resin (a) as defined in claim 1, optionally further comprising coupling agent (c) as defined in claim 1, a filler part comprising a filler according to filler (b) as defined in claim 1; and an initiator part comprising an initiator system according to initiator system (d) as defined in claim 1, wherein the MMA residues of component (a)(i) are present in the acrylic resin in the form of a MMA residue containing (co)polymer, comprising at least 80% residues of MMA by weight of the (co)polymer.

29. A method of manufacturing synthetic stone comprising the following steps:
   a. mixing an acrylic resin according to acrylic resin (a) as defined in claim 1, a filler according to filler (b) as defined in claim 1, and optionally a coupling agent (c) as defined in claim 1 and optionally an initiator system (d) as defined in claim 1;
   b. adding the mixture to a mould and substantially deaerating the mixture;
   c. curing the mixture by heating; and
   d. optionally polishing the cured mixture.

30. A method of manufacturing synthetic stone comprising the following steps:
   a. mixing an acrylic resin according to acrylic resin (a) as defined in claim 1, a filler according to filler (b) as defined in claim 1, and optionally a coupling agent (c) as defined in claim 1 and optionally an initiator system (d) as defined in claim 1;
   b. substantially deaerating the mixture,
   c. adding the mixture to a press;
   d. curing the mixture by heating; and
   e. optionally polishing the cured mixture.

31. A method according to claim 29 wherein the MMA residue component of (a)(i) may be present, when initially mixed with (b) in step a., in an amount of at least 20% by weight of the acrylic resin.

32. A synthetic stone comprising:—
   (a) 3 to 25 wt % acrylic resin, the acrylic resin comprising:—
      i. >50 up to 95 wt % methyl methacrylate monomer residues of the MMA and MMA residues as defined in claim 1,
      ii. 4 to 40 wt % higher boiling point mono(alk)acrylate monomer residues of the higher boiling point mono(alk)acrylate monomer as defined in claim 1,
      iii. optionally, 0 to 10 wt % other acrylate or vinyl comonomer residues of acrylate or vinyl comonomers as defined in claim 1, and
      iv. crosslinking agent residues of crosslinking agents as defined in claim 1;
   (b) 70 to 95 wt % filler as defined in claim 1; and
   optionally, coupling agent residues of coupling agents as defined in claim 1.

* * * * *